United States Patent
Spooner et al.

(10) Patent No.: US 6,608,899 B1
(45) Date of Patent: Aug. 19, 2003

(54) TELEPHONE CIRCUIT SURGE PROTECTION MODULE

(75) Inventors: Jay Edward Spooner, Spring Hill, FL (US); David William Crepeau, New Port Richey, FL (US); Harry Raymond Braunstein, Palm Harbor, FL (US); Ryan James Cramer, Calgary (CA)

(73) Assignee: Circa Telecom U.S.A., Inc., Hudson, FL (US)

( * ) Notice: Subject to any disclaimer, the term of this patent is extended or adjusted under 35 U.S.C. 154(b) by 0 days.

(21) Appl. No.: 09/246,360

(22) Filed: Feb. 8, 1999

(Under 37 CFR 1.47)

(51) Int. Cl.[7] .................................................. H04M 9/08
(52) U.S. Cl. .................................... 379/412; 379/413.04
(58) Field of Search .......................... 379/412, 413.01, 379/413.02, 413.03, 413.04

(56) References Cited

U.S. PATENT DOCUMENTS

| | | | | |
|---|---|---|---|---|
| 4,944,003 A | * | 7/1990 | Meyerhoefer et al. | ...... 379/412 |
| 5,177,782 A | * | 1/1993 | Henderson et al. | ......... 379/412 |
| 5,863,215 A | * | 1/1999 | Debbaut et al. | ............ 439/412 |
| 6,084,761 A | * | 7/2000 | Casey et al. | ................. 379/412 |

* cited by examiner

Primary Examiner—Forester W. Isen
Assistant Examiner—Jefferey Harold
(74) Attorney, Agent, or Firm—Stanley M. Miller

(57) ABSTRACT

A surge protection device has a modular construction so that a manufacturer can assemble the parts in any combination desired by a customer. This eliminates any need to maintain large varieties of surge protection modules in inventory. The modular construction includes a housing having a plurality of bores formed therein into which is press fit long pins and short pins for electrical communication with an external power source and an internal customer telephone circuit, respectively. The housing further includes a pair of recesses into each of which may be press fit a positive temperature coefficient resistor. A first embodiment of spring clips helps hold the positive coefficient resistors in place and provides needed electrical contacts, and a second embodiment of spring clips further includes an elongate part that extends to a test point opening formed in a cover for the modular device. The modular assembly may include either a gas tube or a solid state surge protector, a fail safe device, an insulator member that is melted by the fail safe device when needed, a backup air gap formed in two different ways, and conductive shunt bars for use when the spring clips are not used.

12 Claims, 15 Drawing Sheets

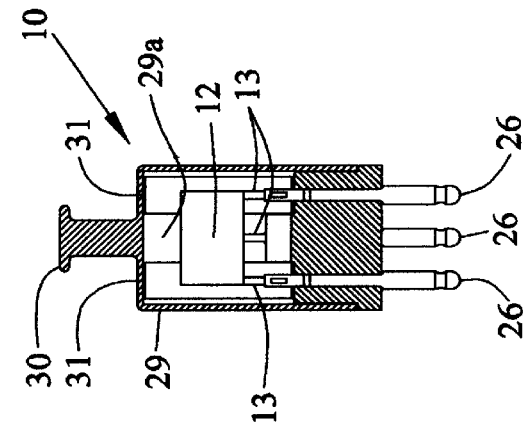
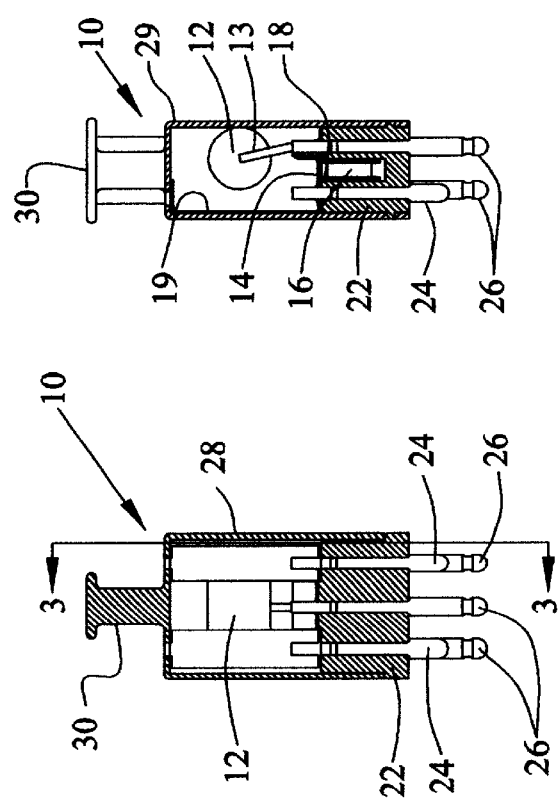
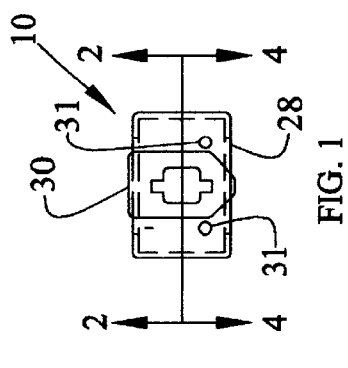

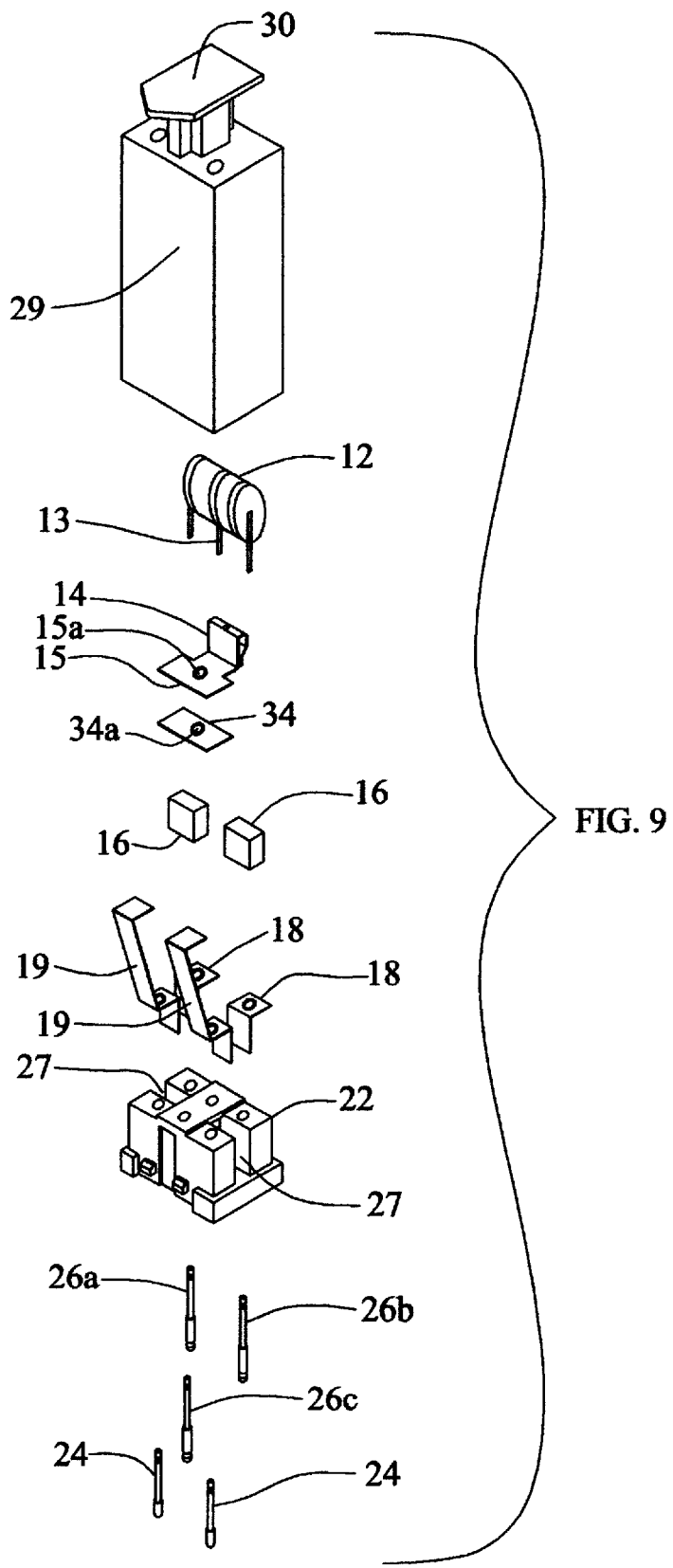

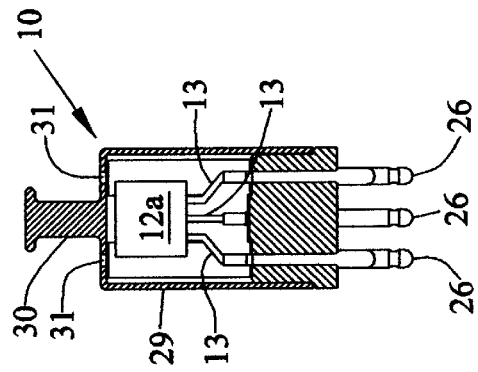
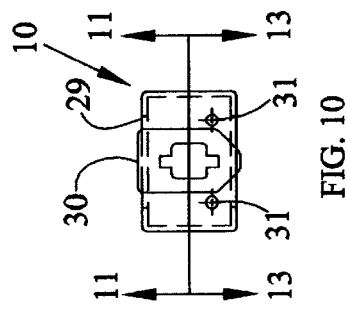
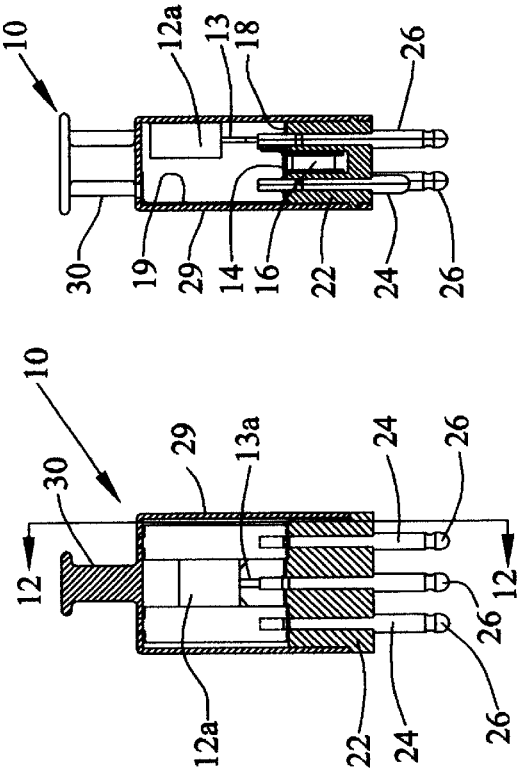

TELEPHONE CIRCUIT SURGE PROTECTION MODULE

BACKGROUND OF THE INVENTION

1. Field of the Invention

This invention relates, generally, to devices that protect a telephone system inside a building from electrical disturbances that occur outside the building. More particularly, it relates to improvements in a five pin building entrance surge protection module.

2. Description of the Prior Art

The National Electric Code requires the telephone industry to provide electrical surge protection at the point of entry where copper wires enter a building. The code requires that telephone equipment within the building be protected from three types of electrical hazards: 1) surge protection from lightning and switching surges; 2) over current protection; and 3) circuit lock-out protection for use in the event a disturbance remains on the circuit for an extended period of time.

The required protection is provided by installing a building entrance panel at the point where the outside lines enter the building. The panel includes a surge protection module for each telephone circuit in the building so that each interior telephone circuit is protected from external electrical disturbances. The panel further includes a means for overcurrent protection and a circuit lock-out means.

The well-known surge protection module has five (5) pins. Two of the pins are in electrical communication with the customer's telephones and three of them are in electrical communication with power supplied by a utility company.

There are a number of shortcomings with the modules now in use. One of the main drawbacks is that components are designed to perform only one function, such as an electrical or a mechanical function. Thus, multiple components are required to perform multiple functions and a large variety of components must be manufactured to handle the differing requirements of differing applications.

In other words, the known surge protection modules are not of modular construction; each of them must be built to a customer's specifications.

It follows that there is a need for a component that combines multiple functions, thereby reducing the number of components required for a job.

More particularly, customer requirements differ concerning whether or not a gas tube or a solid state arrester is used for a particular installation. The prior art components are either one or the other, i.e., there are no components that can be provided with either type of arrester.

A need has therefore been perceived for a component that can be provided with either type of arrester at the time of its assembly. This avoids a need to make and store two types of components.

Some, but not all, applications require a thermal fail-safe that shorts out the circuit to prevent long-duration fault currents from reaching customer equipment. Some prior art components are thus manufactured to include such thermal fail-safe means, and some are not. Thus it should be understood that the prior art requires a manufacturer to make components having a gas tube arrester and a thermal fail-safe means, a gas tube arrester and no fail-safe means, a solid state arrester having a thermal fail-safe means, and a solid state arrester having no thermal fail-safe means.

Clearly, a design that would obviate the need for these four different configurations would be highly beneficial.

Moreover, some applications require a back-up protective air gap that sparks over (arcs) at a predetermined voltage if the surge arrester fails to limit the surge voltage in time, and some do not. The multiplier effect this has on the number of different types of components that must be manufactured and kept on hand is apparent.

Moreover, some, but not all, components must include a current-limiting device that quickly limits current and prevents damage to customer equipment for long duration high current faults.

Finally, most components will require test points allowing service personnel to determine if a circuit is energized and to analyze other communication problems that occur. However, some customers decline such option; this creates still another inventory problem for the industry.

It is clear, then, that the art currently requires manufacturers to make many different configurations of components, each of which has a different mixture of devices. This creates inventory problems and drives up the cost of the custom-built components.

Another problem that has troubled the surge protection industry involves the positive temperature coefficient resistors used by the industry. Such devices have electrical leads that require soldering when a connection is made. Thus, there is a need for an improved resistor having no electrical leads.

However, in view of the art considered as a whole at the time the present invention was made, it was not obvious to those of ordinary skill in this art how the art could be improved.

SUMMARY OF THE INVENTION

The long-standing but heretofore unfulfilled need for an apparatus that overcomes the limitations of the prior art is now met by a new, useful, and nonobvious invention. The present invention is a telephone circuit surge protection assembly of the type disposed at the entrance into a building having at least one telephone circuit inside said building. Significantly, it is built of modular parts so that said parts can be assembled in any configuration as may be required by a customer. The modular parts include a housing, a first plurality of electrically-conductive pins adapted for electrical communication with power supplied by a remote utility company, a second plurality of pins adapted for electrical communication with said at least one telephone circuit, and a plurality of bores formed in the housing for receiving the pins. In this way, the bores in the housing serve to properly position the pins when a unit is assembled.

A surge protection means is in electrical communication with preselected pins of said first plurality of pins; advantageously, due to the modular structure of the novel device, the surge protection means may be of the gas tube type or of the solid state type. The type used is dictated by the application.

Electrically conductive means are mounted on the housing to provide electrical communication between the first plurality of pins and the second plurality of pins.

A cover holds together the housing, the surge protection means, and additional components of the assembly as well.

The electrically conductive means includes a pair of flat, electrically conductive strips that overlie the housing and which are apertured at their respective opposite ends to engage their respective pins.

The housing has at least one recess formed therein that is sized to snugly receive a positive temperature coefficient resistor therein so that the assembly may be assembled to include at least one positive temperature coefficient resistor. The electrically conductive means is in electrical communication with at least one positive temperature coefficient resistor.

The positive temperature coefficient resistors of this invention are of parallelepiped construction and have no electrical leads extending therefrom as in prior art resistors of the same type. The housing and the recesses formed therein for receiving the resistors eliminates the need for such electrical leads.

The electrically conductive means is provided in the form of a plurality of electrically conductive spring clips that are engaged by respective pins of the plurality of pins. The spring clips are also disposed in electrically conductive relation to at least one positive temperature coefficient resistor.

Each of said spring clips has an "L" shape and a first leg of each spring clip is engaged by one of the pins. A second leg of each spring clip is positioned within at least one recess formed in the housing so that the first leg is in electrical communication with a preselected pin and so that the second leg is in electrical communication with at least one positive temperature coefficient resistor.

A pair test point access openings may also be formed in the cover.

The plurality of spring clips includes at least two spring clips having elongate necks formed integrally with the respective first legs of the spring clips, said elongate necks respectively having a bend formed therein remote from the first and second legs to form a test point contact surface. The respective elongate necks are sized so that the respective test point contact surfaces are in registration with the pair of test point openings formed in the cover.

A fail safe device may also be disposed in electrically communicating relation between the electrically conductive strips and the surge protection means.

Moreover, a meltable insulator means may be disposed between the fail safe device and the electrically conductive means; it melts and provides a path to ground if high current appears for a predetermined length of time.

There are also two ways of providing a backup air gap that provides a flashover path to ground when needed.

Advantageously, the pins of the first plurality of pins have a common length that is less than a common length of the pins of the second plurality of pins. The pins of the first plurality of pins are in electrical communication with the telephone circuit, and the pins of the second plurality of pins are in electrical communication with the power supplied by the remote utility company. The difference in respective common lengths ensures that the pins of the first plurality of pins are in electrical isolation from the power from the remote utility company when the plurality of pins are in electrical communication with the remote utility company.

It is the primary object of this invention to provide a modular five pin protection module so that individual customer requirements can be met without requiring manufacturers to make a wide variety of components, each of which has different features.

Another important object is to provide a positive temperature coefficient resistor having no electrical leads.

Other important objects, features, and advantages of the invention will become apparent as this description proceeds.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which:

FIG. 1 is a top view of the novel gas tube protection module;

FIG. 2 is a sectional view of said module taken along line 2—2 in FIG. 1;

FIG. 3 is a side sectional view taken along line 3—3 in FIG. 2;

FIG. 4 is a sectional view taken along line 4—4 in FIG. 1;

FIG. 9 is an exploded perspective view of a fifth configuration of the novel system;

FIG. 10 is a top view of the novel solid state protection module;

FIG. 11 is a front sectional view of said module taken along line 11—11 in FIG. 10;

FIG. 12 is a side sectional view taken along line 12—12 in FIG. 11;

FIG. 13 is a rear sectional view taken along line 13—13 in FIG. 10;

DETAILED DESCRIPTION OF THE PREFERRED EMBODIMENT

Figure 5:
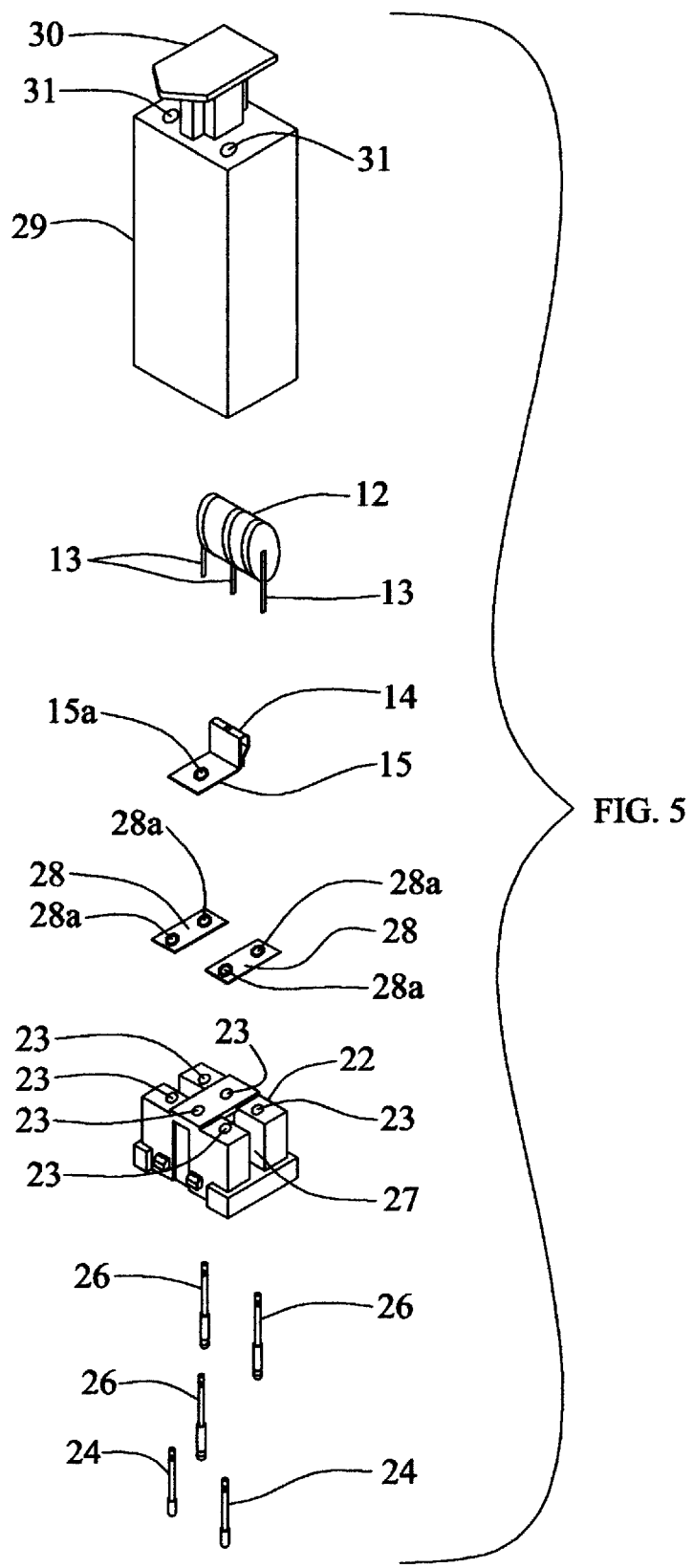
FIG. 5 is an exploded perspective view of a first configuration of the novel system.

Referring now to FIGS. 1–4, it will there be seen that a first exemplary embodiment of the invention is denoted as a whole by the reference numeral 10. This embodiment incorporates a gas tube surge protector 12 having electrically conductive leads 13, a fail safe device 14, a positive temperature coefficient (PTC) resistor 16 for limiting current by increasing the series resistance of the circuit during excessive current flow, "L"-shaped spring clips 18, spring clips with test point contacts 19, housing 22, short pins 24 and long pins 26. Short pins 24 are in electrical communication with customer equipment and long pins 26 are in electrical communication with power supplied by a utility company. Housing 22 has a plurality of bores, collectively denoted 23, for receiving the respective narrow necks of the pins; note in FIGS. 2–4 that the broader bases of said pins are too wide to enter the bores. Thus, the broad bases of the pins serve as insertion-limiting means.

A cover 29 performs the function its name expresses and a handle 30 formed integrally therewith provides means for installing the novel module in the field and for removing the novel module 10 when needed. Cover 29 also provides a fire barrier, a means that helps hold the PTCs in place, test point access, and a labeling surface.

Long pins 26 make electrical contact with their respective sockets prior to the making of electrical contact by the short pins with their respective sockets. In this way, the utility company's side of the circuit is protected from surges and the customer's equipment is isolated from the incoming line.

Pins 24 and 25 are tubular or at least semi-tubular; thus, both inside and outside surfaces of said pins may be used for making mechanical and electrical connections.

The first step in the assembly process is to insert pins 24, 26 into their respective bores. In the embodiment of FIG. 5, no PTCs are used and thus no spring clips 18 are employed to hold said PTCs. Accordingly, a pair of bridge shunt bars, collectively denoted 28, are provided. Each bridge shunt bar 28 is flat and has an aperture 28a formed in each of its opposite ends, and each aperture 28a is barbed so that the respective leading ends of the pins easily slides therethrough, but cannot slide in the opposite direction. In this way, the barbs prevent unwanted retraction of the pins from their respective bores 23. Bridge shunt bars 28 provide electrical communication between short pins 24 and long pins 26 and thus between the customer's internal equipment and the utility company's external line when there are no PTCs 16 and spring clips 18 to perform that function.

There are more bores 23 than pins 24, 26; this allows use of differing configurations of the pins.

It should be understood from the outset that the embodiment depicted in FIGS. 1–4 is just one configuration of numerous configurations that are easily assembled when the teachings and suggestions of this invention are followed.

FIG. 5 depicts a configuration lacking spring clips and PTCs. From FIG. 5 is it understood that the two short pins, collectively denoted 24 and the three long pins, collectively denoted 26, are pushed through their respective bores 23; thus, housing 22 serves to locate the pins. After pins 24, 26 have been received through bores 27a of their associated bridge shunt bars 28, fail safe device 14, having aperture 15a formed in mounting flange 15, is installed by engaging said aperture 15a to a preselected pin. Contacts 13 of gas tube 12 are then brought into electrical engagement with respective tops of preselected pins, as indicated in FIGS. 2–4, and cover 29 is then slid onto the assembly. Note from FIG. 4 that cover 29 includes a depending member 29a that engages the top of gas tube 12 to hold it in place.

Moreover, test point apertures 31, 31 formed in cover 29 should be noted. They allow contact by test instruments with test point spring clips that are disclosed hereinbelow. Advantageously, cover 29 may be manufactured with punch outs so that the punch outs remain in place for those customers not ordering a module having test points; it is convenient to remove the punch outs and thereby provide apertures 31 for those customers ordering modules having test points.

Figure 6:
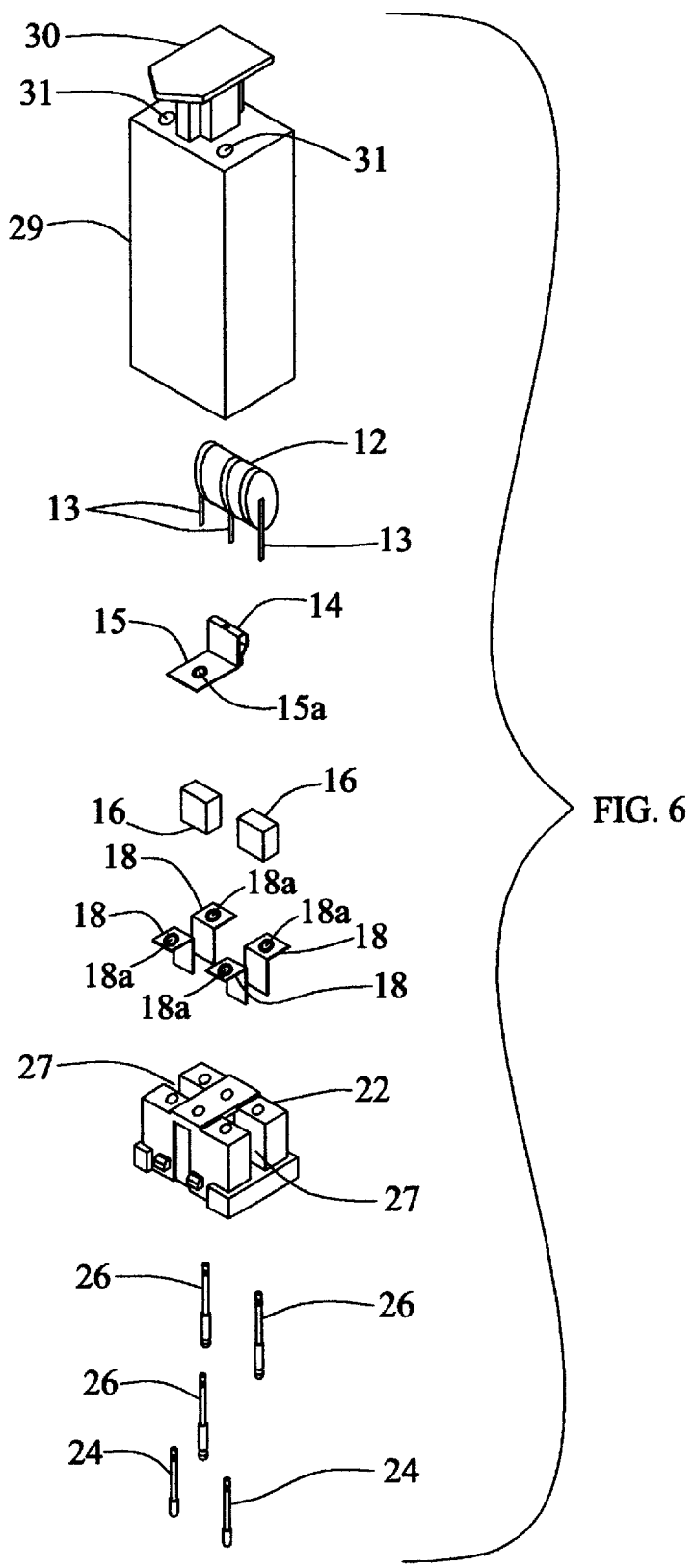
FIG. 6 is an exploded perspective view of a second configuration of the novel system.

FIG. 6 depicts an embodiment where PTCs 16 are used; thus, there is no need in this embodiment for bridge shunt bars 28. Instead, "L"-shaped spring clips 18 are used to engage each pin. Each spring clip 18 has a barbed central aperture 18a formed in a laterally-extending part thereof as depicted; these barbed apertures permit facile entry of the leading end of the respective pins 24, 26, but prevent retraction of said pins therefrom.

As perhaps best understood by comparing FIGS. 3 and 5, housing 22 has a pair of cavities, collectively denoted 27, formed therein for the sliding reception of PTCs 16. The nonapertured leg of each spring clip 18 overlies a sidewall of one of the recesses, and serves to tightly engage its associated PTC 16. This assures a good electrical contact between each PTC and its associated pins and thus between the external utility company circuit and the internal customer circuit. Just as importantly, the provision of said recesses and said spring clips enables a manufacturer to assemble a protection module with or without PTCs, and thus does not require said manufacturer to build complete modules having PTCs and not having PTCs, i.e., a customer's order can be assembled at the time of need in accordance with the customer's specifications.

Significantly, PTCs 16 have no electrical leads extending therefrom as in the non-modular PTCs heretofore known. Thus, the novel modular design (and recesses 27 specifically) eliminates the need for leads on the PTCs. Moreover, spring clips 18 eliminate the need for springs to hold the PTCs in place; prior art structures require separate springs for holding said PTCs.

Figure 7:
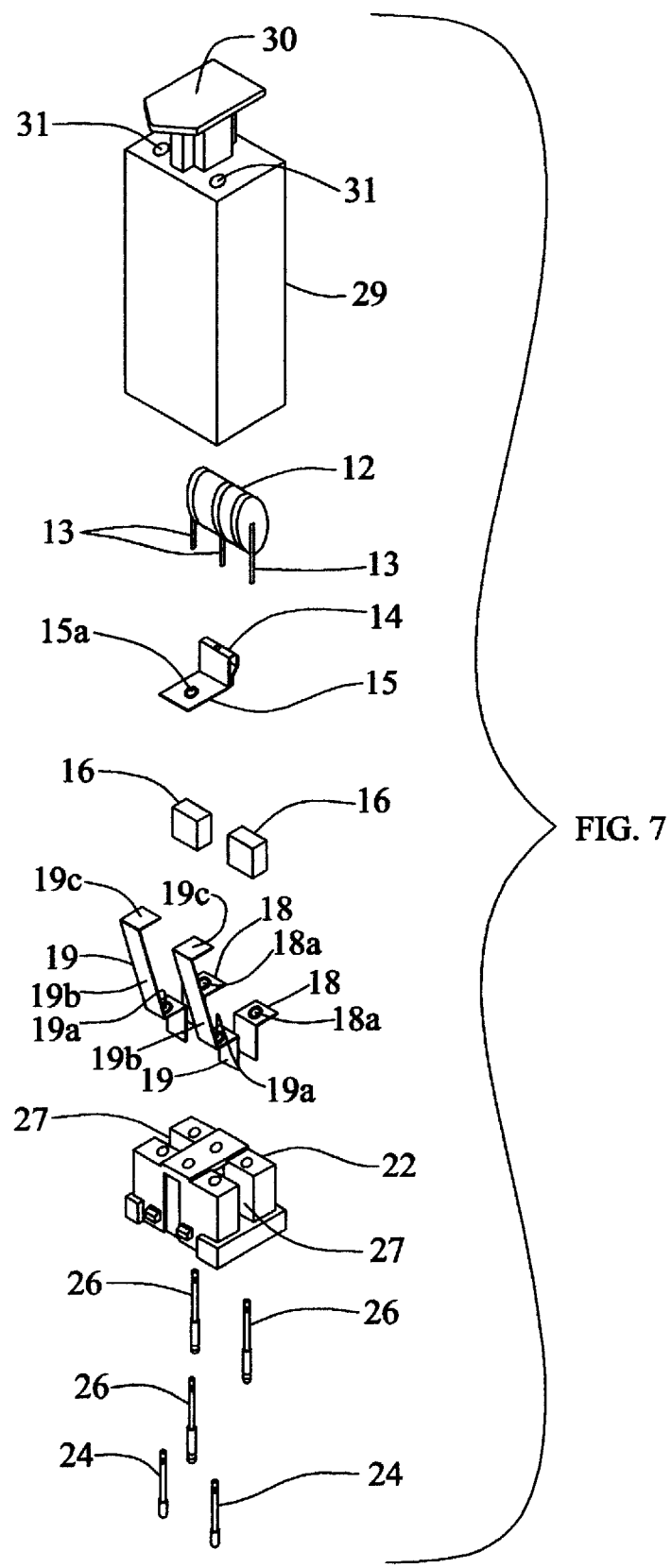
FIG. 7 is an exploded perspective view of a third configuration of the novel system.

The configuration of FIG. 7 is assembled when a customer requires a gas tube protection module with PTCs and test points. Note that no test points are provided in the module of FIG. 6. In the embodiment of FIG. 7, two of the spring clips 18 have been replaced by test point clips 19. Test point clips 19 are provided with barbed apertures 19a that perform the same function as barbed apertures 18a, and further include elongate necks 19b surmounted by laterally-extending test point surfaces 19c, 19c. These test point surfaces are in registration with test point access openings 31, 31 formed in cover 29. Test point clips 19 are installed on the utility side of the module, i.e., they are engaged by long pins 26.

Figure 8:
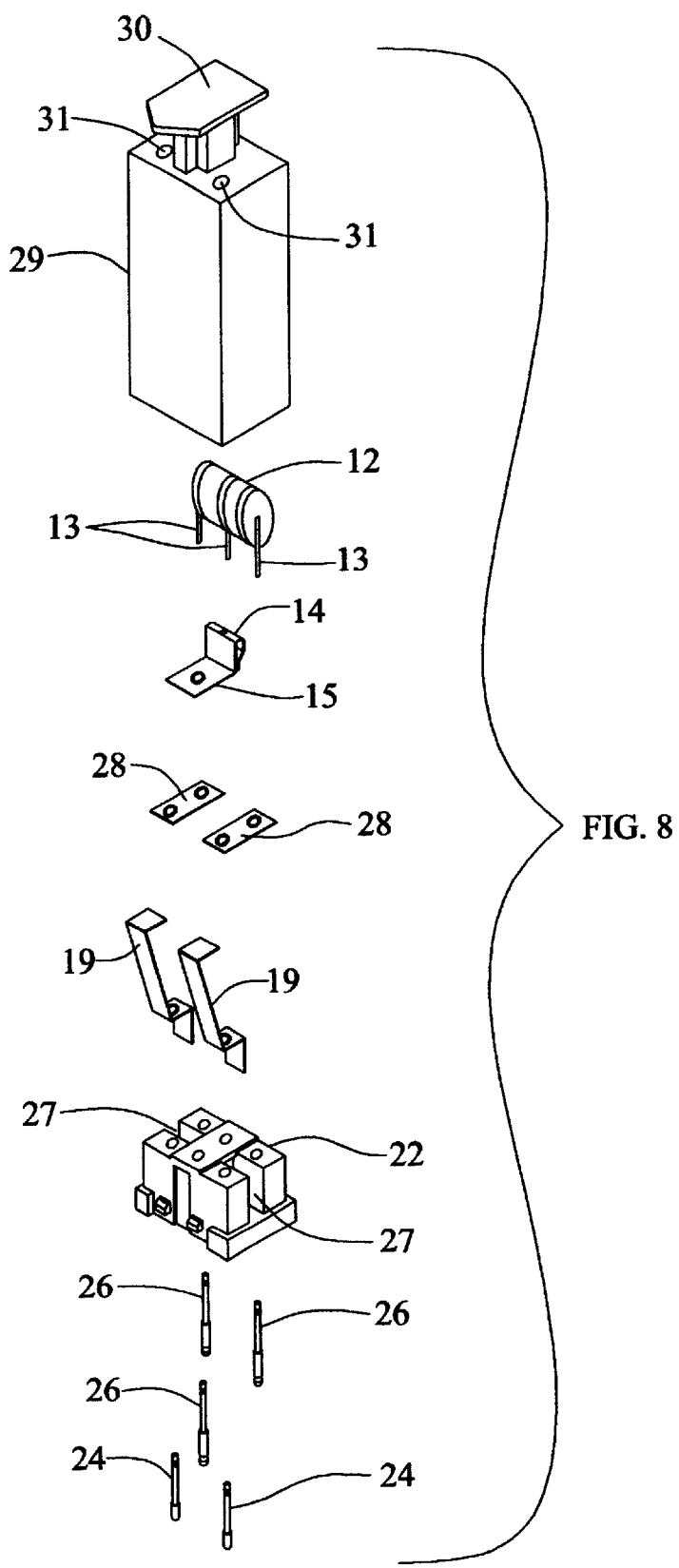
FIG. 8 is an exploded perspective view of a fourth configuration of the novel system.

The configuration of FIG. 8 is assembled by the manufacturer when the customer's specifications call for a gas tube protection module having test points but lacking PTCs 16. Thus, bridge shunt bars 28 as disclosed in FIG. 5 are used.

FIG. 9 depicts an assembly that includes PTCs 16 and test points 19, as well as fail safe device 14 and a Mylar® insulator 34. Fail safe device 14 shorts out the circuit to prevent long duration fault currents from reaching customer equipment, i.e., said device operates when over current has flowed through spring clips 18, 19 for an extended period of time. Mylar insulator 34 underlies flange 14b. If fail safe device 14 is overheated, in response to extended over current conditions, fail safe device 14 melts Mylar insulator 34 and shorts the tip or ring leads to ground on the telephone company side of the module. Once failsafe device 14 has performed its function, the module must be replaced to restore normal telephone service but the customer's equipment beyond the module is protected.

Figure 9A:
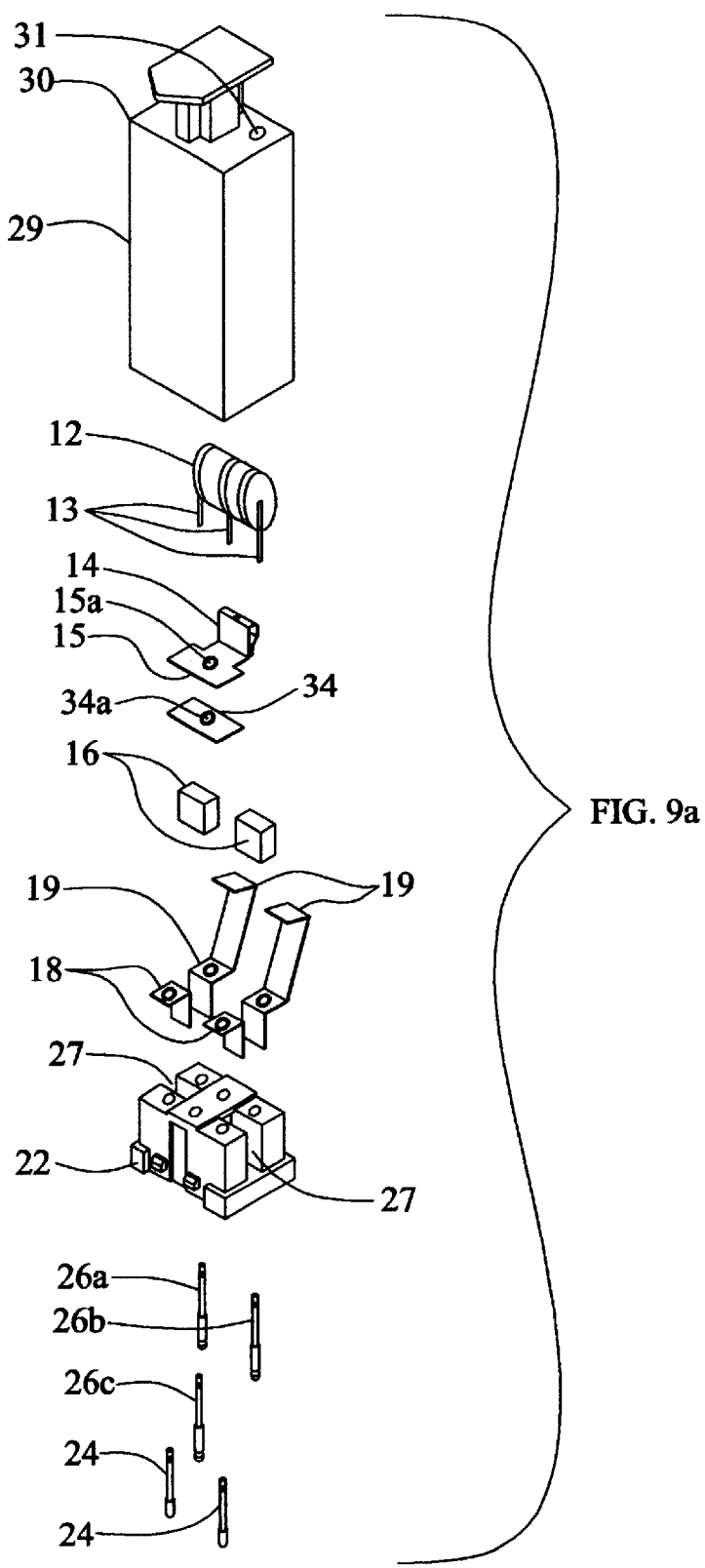
FIG. 9a is an exploded perspective view of a sixth configuration of the novel system.
Figure 14:
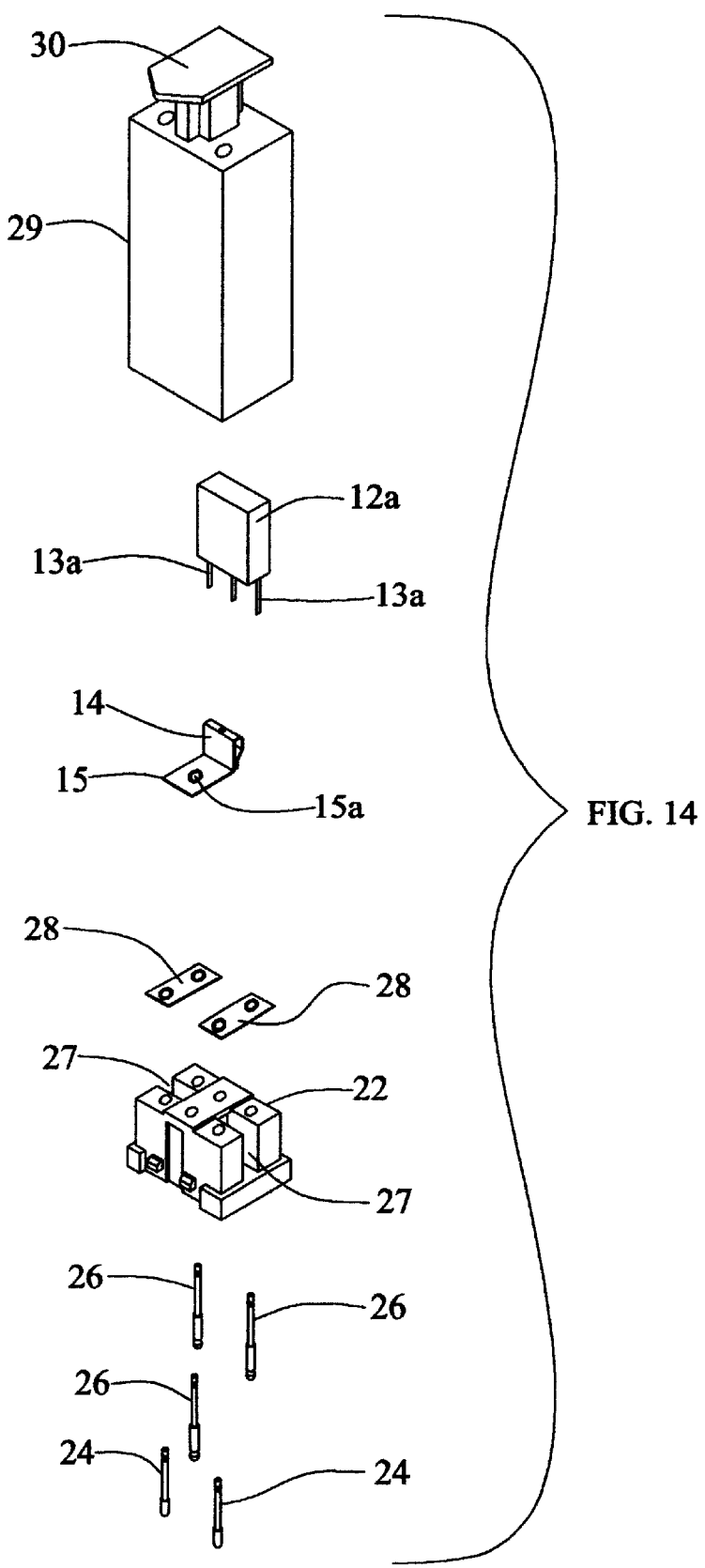
FIG. 14 is an exploded perspective view of a seventh configuration of the novel system.
Figure 15:
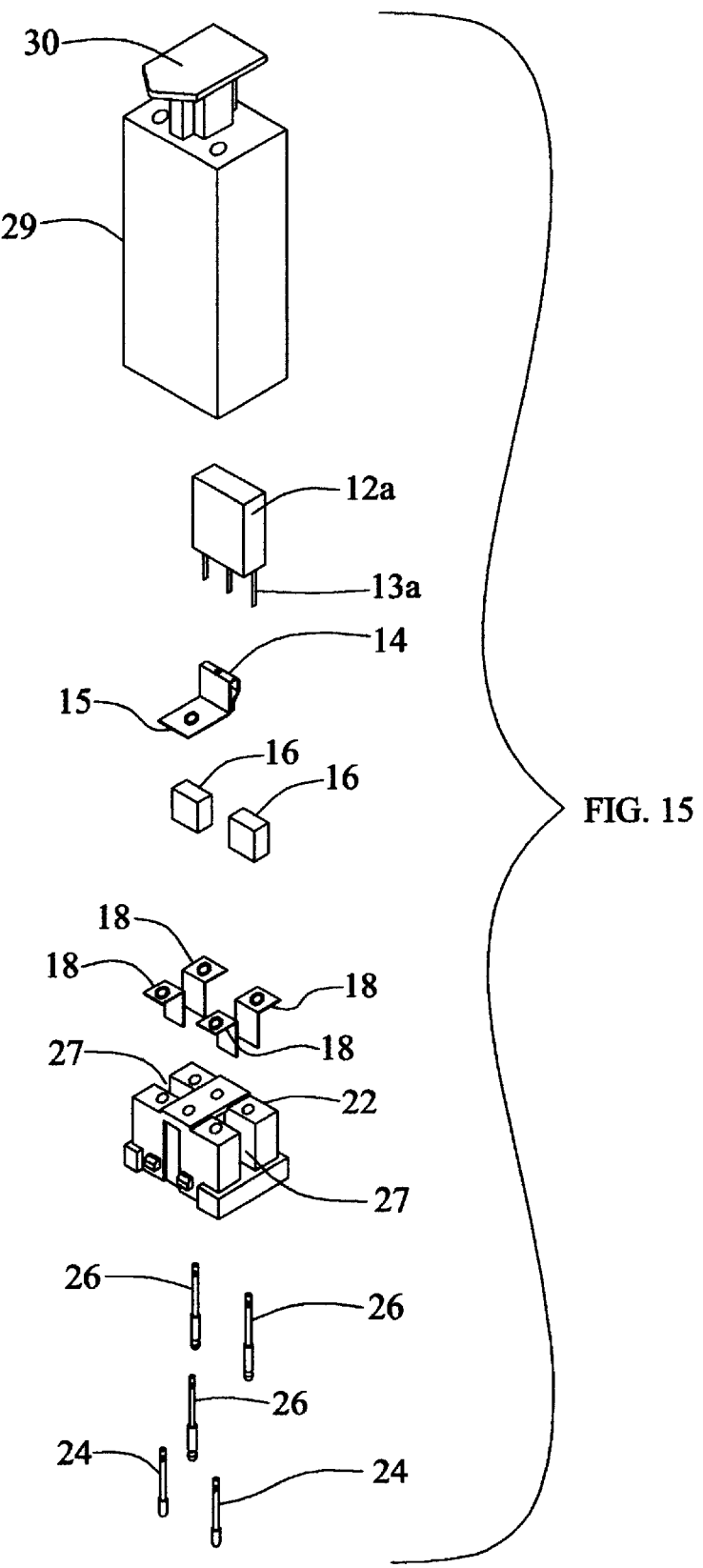
FIG. 15 is an exploded perspective view of a eighth configuration of the novel system.
Figure 16:
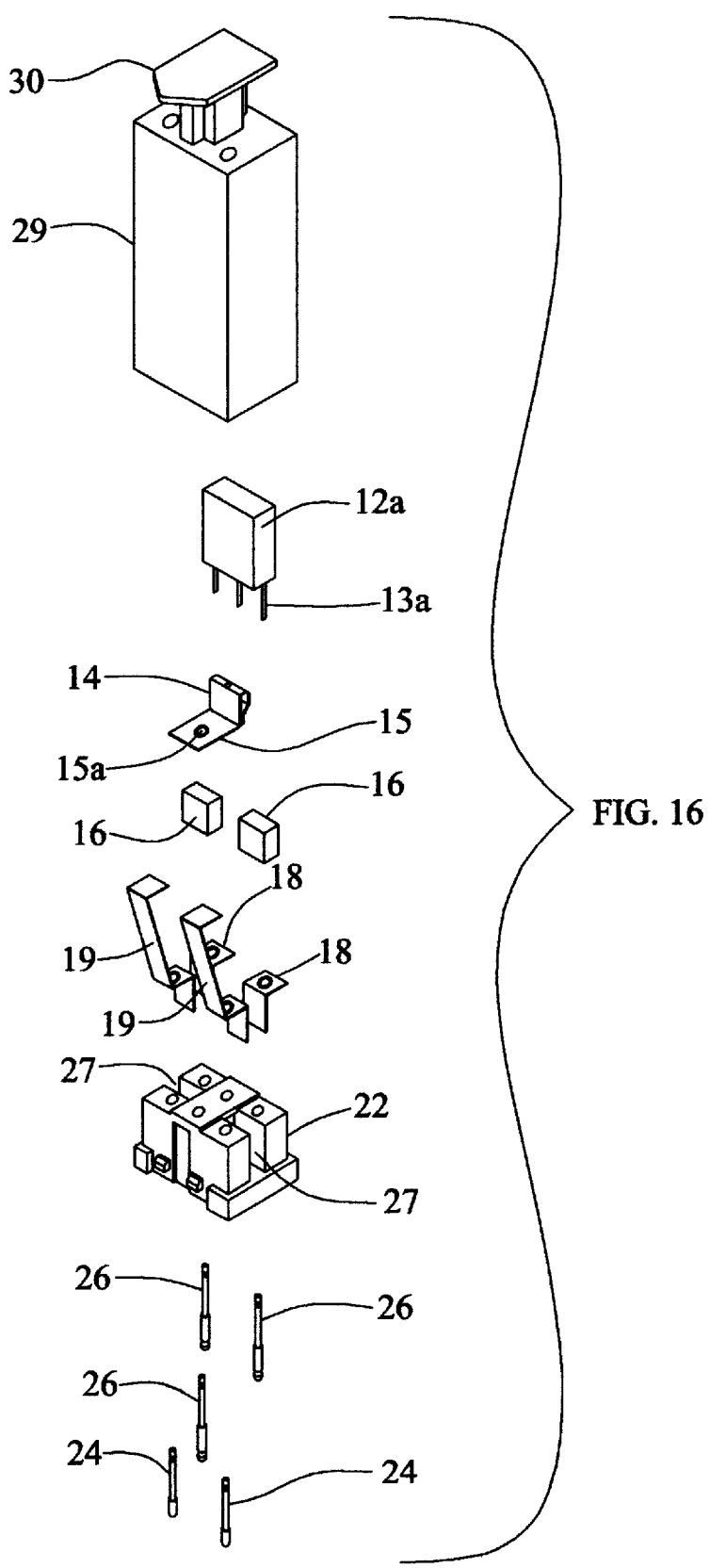
FIG. 16 is an exploded perspective view of an ninth configuration of the novel system.
Figure 17:
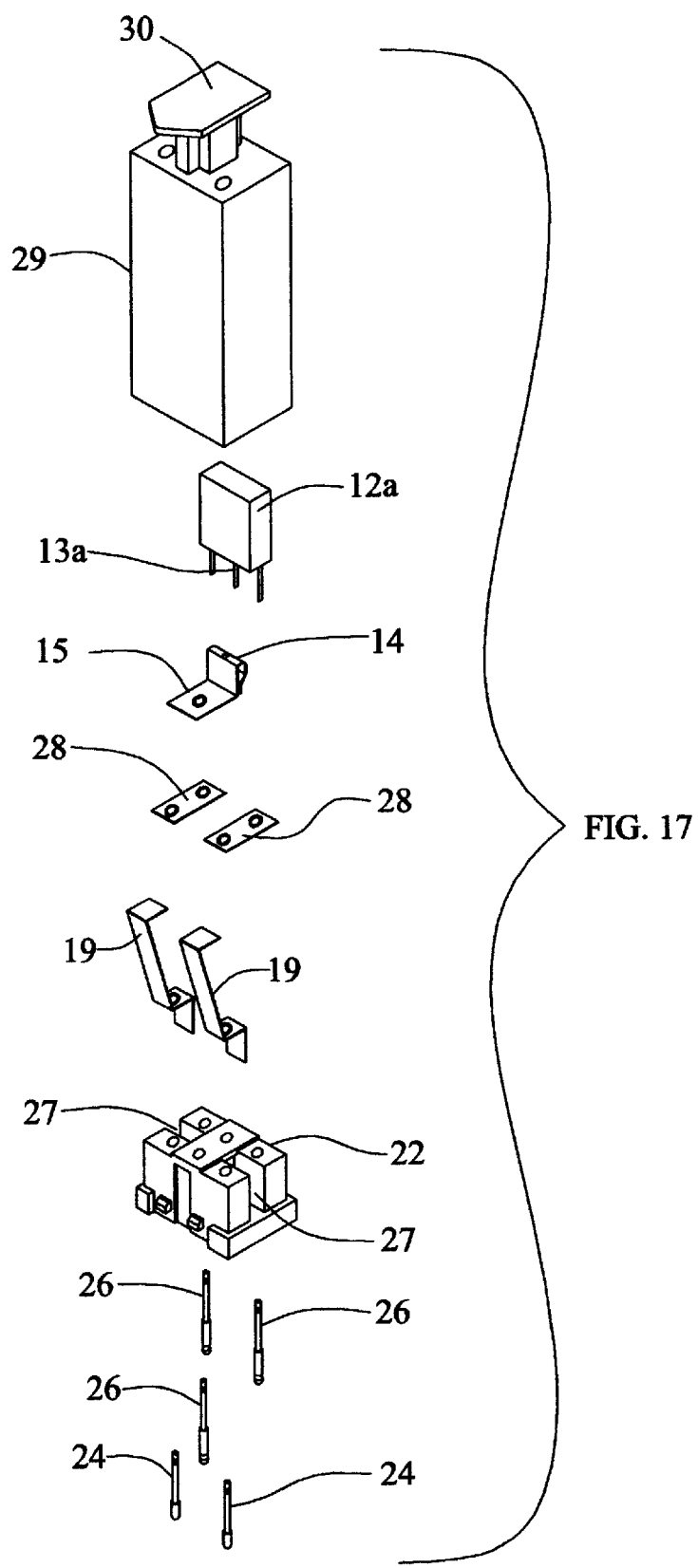
FIG. 17 is an exploded perspective view of a tenth configuration of the novel system.
Figure 18:
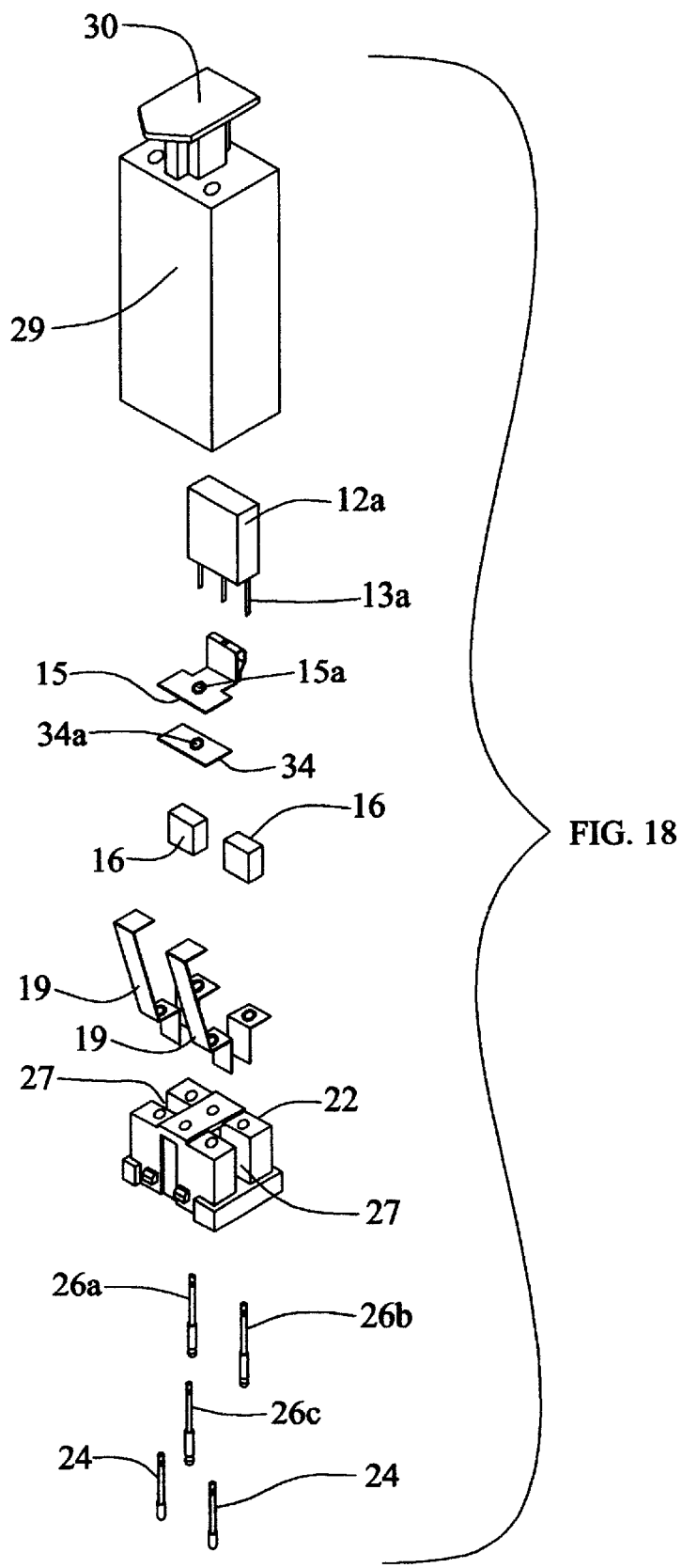
FIG. 18 is an exploded perspective view of a eleventh configuration of the novel system.

FIG. 9a depicts an assembly identical to that shown in FIG. 9 except that spring clips 18 and test point clips 19 are reversed for a customer that desires to have the test probes on the utility company side of the module.

To assemble the inventive structure, pins 24 and 26 are pushed through housing 22 and the spring clips 18 are pushed over the top of the pins. The apertures formed in said spring clips are barbed to hold the pins in place and to provide electrical communication between the spring clips and said pins. The PTC's are then inserted if required. Mylar insulator 34 is then placed over back center ground pin 26c and the customer side tip and ring (ground and positive) pins. Mylar insulator 34 is held in place by pushing the fail safe spring bar over said center ground pin. Modular fail safe device 14 and Mylar insulation 34 is not needed in arrestors that include built-in fail safe means.

Aperture 15a, formed in laterally extending flange 15, and aperture 34a, formed in Mylar insulator 34, collectively form an air gap, of predetermined distance, that provides a path to ground from the tip and ring (ground and positive). The length of the air gap is determined by the combined thickness of flange 15 and Mylar insulator 34. The air gap flashes over at 500–1500 volts to protect the customer's equipment if the arrestor fails to operate; accordingly, it is known as the backup air gap.

In a second embodiment of the backup air gap (see FIG. 5), flange 15 of fail safe device 14 and bridge shunt bars 28 are held at a fixed spacing to provide the backup air gap without Mylar insulator 34. This embodiment is for use with gas tube modules because they include a failsafe means as a part of the arrestor.

The module of FIGS. 10–13 differs from that of FIGS. 1–4 only in that a solid state arrester is provided instead of a gas tube arrester. Similarly, the five exemplary configurations of FIGS. 14–18 differ from the five respective configurations of FIGS. 5–9 in the same way.

The tubular structure of the pins is advantageous because it facilitates electrical and mechanical mounting of leads thereto. For example, leads may be connected by press fitting them into the cylindrical interior of the pins, by inserting a lead thereinto and by crimping the pin to engage the lead, by soldering leads to the pins, by providing anti-retraction pins within the cylindrical interior of the pins for engaging leads, and so on.

Figure 19:
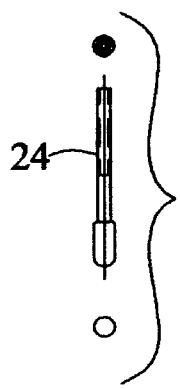
FIG. 19 is an exploded perspective view of a first embodiment of a short pin.
Figure 20:
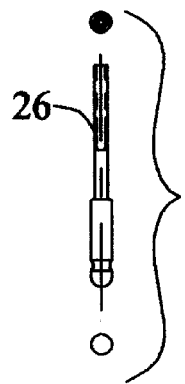
FIG. 20 is an exploded perspective view of a first embodiment of a long pin.
Figure 21:
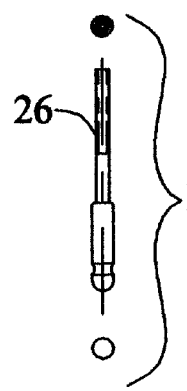
FIG. 21 is an exploded perspective view of a second embodiment of a long pin.
Figure 22:
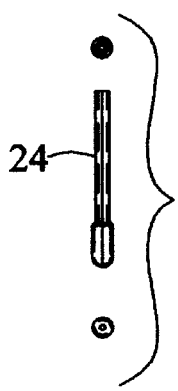
FIG. 22 is an exploded perspective view of a second embodiment of a short pin.
Figure 23:
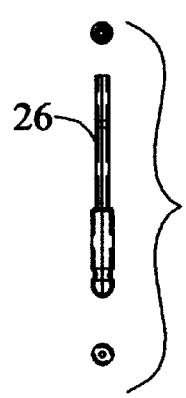
FIG. 23 is an exploded perspective view third embodiment of a long pin.
Figure 24:
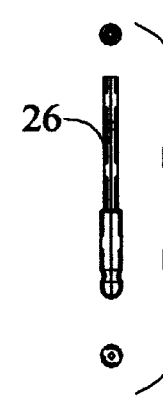
FIG. 24 is an exploded perspective view of a fourth embodiment of a long pin.
Figure 25:
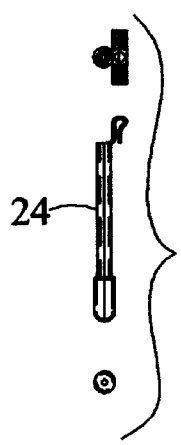
FIG. 25 is an exploded perspective view of a third embodiment of a short pin.
Figure 26:
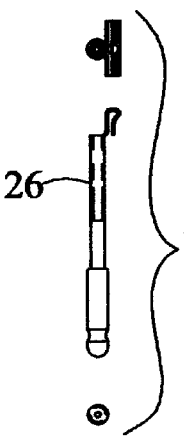
FIG. 26 is an exploded perspective view of a fifth embodiment of a long pin.
Figure 27:
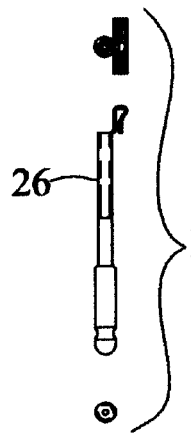
FIG. 27 is an exploded perspective view of a sixth embodiment of a long pin.

FIG. 19 is an exploded perspective view of a first embodiment of a short pin and FIG. 20 is an exploded perspective view of a first embodiment of a long pin. FIG. 21 is an exploded perspective view of a second embodiment of a long pin, FIG. 22 is a an exploded perspective view of a second embodiment of a short pin, and FIG. 23 is an exploded perspective view of a third embodiment of a long pin. FIG. 24 is an exploded perspective view of a fourth embodiment of a long pin, FIG. 25 is an exploded perspective view of a third embodiment of a short pin, FIG. 26 is an exploded perspective view of a fifth embodiment of a long pin, and FIG. 27 is an exploded perspective view of a sixth embodiment of a long pin.

Figure 28A:
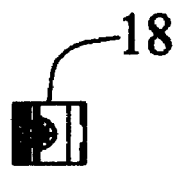
FIG. 28A is a top plan view of an alternate embodiment of the novel spring clip.
Figure 28B:
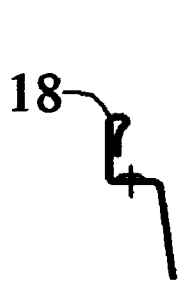
FIG. 28B is a side elevational view of said spring clip.
Figure 28C:
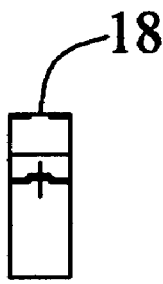
FIG. 28C is a front elevational view thereof.

FIG. 28A is a top plan view of an alternate embodiment of spring clip 18, FIG. 28B is a side elevational view of said spring clip, and FIG. 28C is a front elevational view thereof.

Figure 29A:
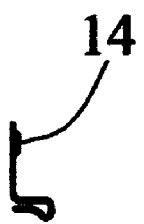
FIG. 29A is a side elevational view of an alternative embodiment of the novel fail safe device.
Figure 29B:
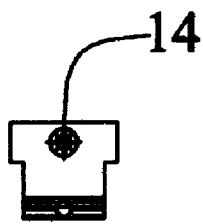
FIG. 29B is a top plan view of said alternative embodiment of said fail safe device.
Figure 29C:
FIG. 29C is a front elevational view thereof.

FIG. 29A is a side elevational view of an alternative embodiment of fail safe device 14, FIG. 29B is a front elevational view of said alternative embodiment, and FIG. 29C is a top plan view thereof.

It will thus be seen that the objects set forth above, and those made apparent from the foregoing description, are efficiently attained and since certain changes may be made in the foregoing construction without departing from the scope of the invention, it is intended that all matters contained in the foregoing construction or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A telephone circuit surge protection assembly of the type disposed at the entrance into a building having at least one telephone circuit inside said building, comprising:

a housing;

a first plurality of electrically-conductive pins adapted for electrical communication with power supplied by a remote utility company;

a second plurality of pins adapted for electrical communication with said at least one telephone circuit;

a plurality of bores formed in said housing for receiving said pins;

a surge protection means in electrical communication with preselected pins of said first plurality of pins;

said housing adapted to house a gas tube surge protection means and a solid state surge protection means so that a manufacturer may configure for a user said telephone circuit surge protection assembly to contain either said gas tube surge protection means or said solid state surge protection means;

said housing adapted to receive a plurality of electrically conductive bridge shunt means for providing electrical communication between said first plurality of pins and said second plurality of pins;

said housing adapted to receive at least one positive temperature coefficient resistor so that a manufacturer may configure for a user said telephone surge protection assembly to include either said plurality of electrically conductive bridge shunt means or said positive temperature coefficient resistor;

a cover means that holds together said housing and said surge protection means;

said assembly, including said housing, said pins, said surge protection means, said bridge shunt means and said cover being modular so that said assembly may be assembled to include differing configurations of surge protection means.

2. The assembly of claim 1, wherein said electrically conductive bridge shunt means includes a pair of flat, electrically conductive strips that overlie said housing and which are apertured at their respective opposite ends to engage said respective pins.

3. The assembly of claim 2, further comprising a fail safe device disposed in electrically communicating relation between said electrically conductive strips and said surge protection means.

4. The assembly of claim 3, further comprising a meltable insulator means disposed between said fail safe device and said electrically conductive means, said meltable insulator means having a preselected thickness and a predetermined melting point, said fail safe device melting said meltable insulator means when a high fault current of long duration appears on said utility company side of said module and thereby providing a path to ground.

5. The assembly of claim 4, wherein said fail safe device further includes a flange of predetermined thickness formed therein having an aperture formed therein, wherein said meltable insulator means underlies said flange and has an aperture formed therein that is disposed in registration with the aperture formed in said flange of said fail safe device, and wherein said respective apertures provide a backup air gap that flashes over at a predetermined voltage and provides a path to ground if said surge protection means fails to operate.

6. The assembly of claim 3, wherein said fail safe device further includes a flange of predetermined thickness that is held in a fixed spaced relation to said bridge shunt means to provide a backup air gap that flashes over at a predetermined voltage and provides a path to ground if said surge protection means fails to operate.

7. The assembly of claim 1, further comprising a plurality of electrically conductive spring clips that are engaged by respective pins of said plurality of pins, said spring clips also being disposed in electrically conductive relation to said at least one positive temperature coefficient resistor in a configuration including said at least one positive temperature coefficient resistor.

8. The assembly of claim 7, wherein each of said spring clips has an "L" shape and wherein a first leg of each spring clip is engaged by one of said pins and wherein a second leg of each spring clip is positioned within said at least one recess formed in said housing so that said first leg is in electrical communication with a preselected pin and so that said second leg is in electrical communication with said at least one positive temperature coefficient resistor.

9. The assembly of claim 8, further comprising a pair of test point access openings formed in said cover.

10. The assembly of claim 9, wherein said plurality of spring clips includes at least two spring clips having elongate necks formed integrally with said respective first legs of said spring clips, said elongate necks respectively having a bend formed therein remote from said first and second legs to form a test point contact surface, said respective elongate necks sized so that said respective test point contact surfaces are in registration with said pair of test point openings formed in said cover.

11. The assembly of claim 1, wherein said at least one positive temperature coefficient resistor has a parallelepiped construction and is free of electrical conductors extending therefrom.

12. The assembly of claim 1, wherein said pins of said first plurality of pins have a common length that is less than a common length of said pins of said second plurality of pins, wherein said pins of said first plurality of pins are in electrical communication with said telephone circuit, wherein said pins of said second plurality of pins are in electrical communication with said power supplied by said remote utility company, and wherein said difference in said respective common lengths ensures that said pins of said first plurality of pins are in electrical isolation from said power from said remote utility company when second plurality of pins are in electrical communication with said remote utility company.

\* \* \* \* \*